May 16, 1939. E. E. GLASSLEY 2,158,576
EXTENSION TUBE FOR INFLATING AUTOMOBILE TIRES
Filed Sept. 8, 1937
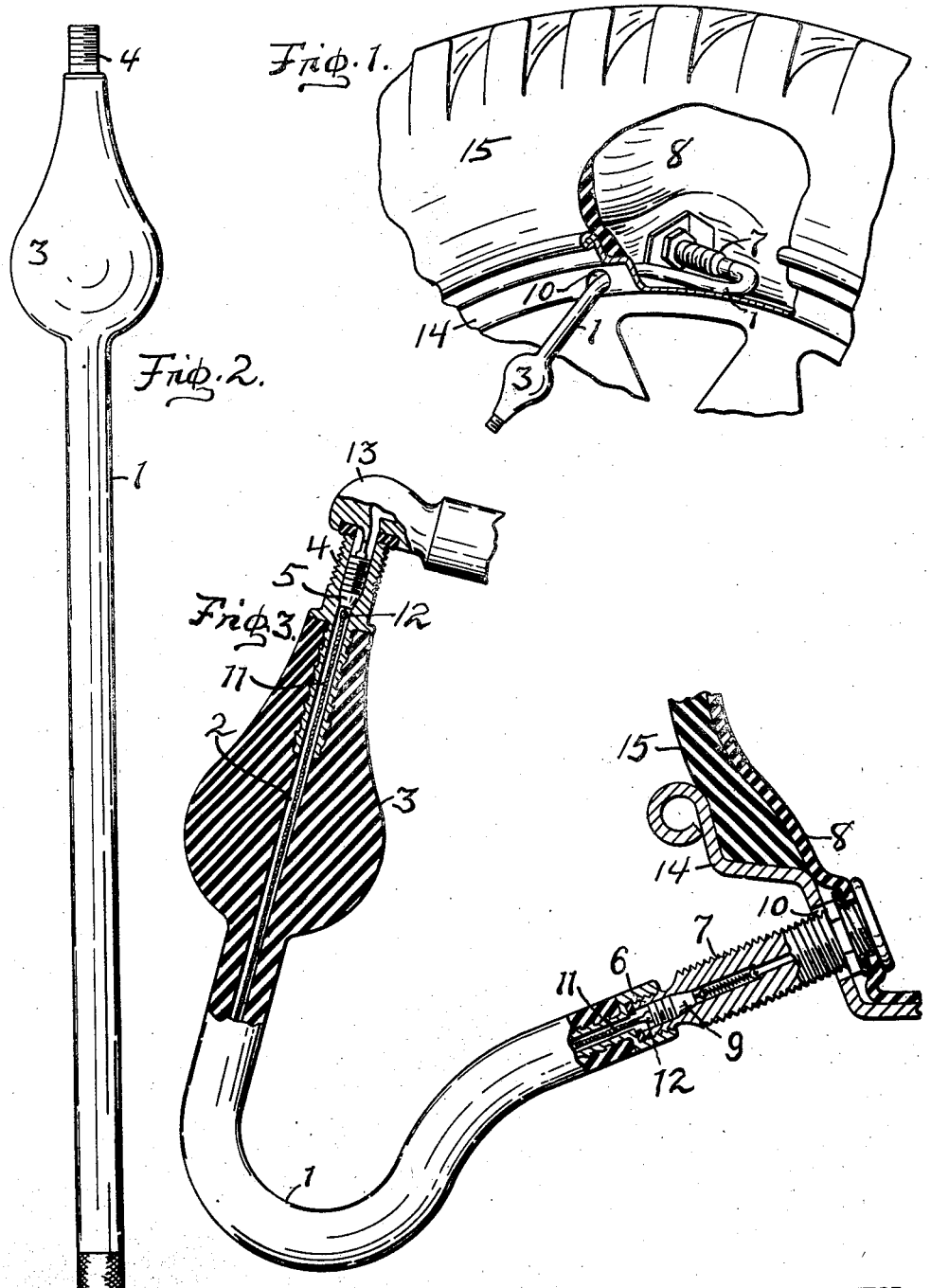
Eugene E. Glassley INVENTOR.
BY
H. G. Burns ATTORNEY.

Patented May 16, 1939

2,158,576

UNITED STATES PATENT OFFICE 2,158,576

EXTENSION TUBE FOR INFLATING AUTOMOBILE TIRES

Eugene E. Glassley, South Whitley, Ind.

Application September 8, 1937, Serial No. 162,912

2 Claims. (Cl. 152—415)

This invention relates to improvements in extension tubes for inflating automobile tires, and an object thereof is to provide an expedient, attachable to the valve-stem on the inner tube of an automobile tire preliminary to its assemblage with the tire outer casing and the wheel-rim, whereby the stem may be drawn through the valve-stem opening in the rim in proper position for inflation of the inner tube.

Another object of the invention is to construct the extension tube so that, when applied in connection with the valve-stem on the inner tube and extending through the valve-stem opening in the wheel-rim, the extension tube is prevented from being drawn into and lost within the tire structure.

Other objects and advantages of the invention appear in the following disclosure.

An illustrative embodiment of the invention is shown in the accompanying drawing, in which:

Fig. 1 is a fragmentary perspective view showing the invention applied to an automobile tire structure;

Fig. 2 is an elevation of the extension tube; and

Fig. 3 is a fragmentary side elevation of the extension tube in connection with the valve-stem of the inner tube of an automobile tire, and also a nozzle tip of an air pressure tester.

The illustrative embodiment of the invention consists of a flexible tube 1 having a bore 2 extending therethrough from one end to the other. One end portion of said tube has an enlargement constituting a knob 3 thereon provided for the purpose hereinafter stated, and has secured therein a nipple 4 in which is situated a tire valve 5 of the usual type employed in the valve-stems of inner tubes for tires. The opposite end of the tube has secured thereon an internally threaded nipple 6 adapted for connection with the valve-stem 7 of the inner tube 8 of an automobile tire, which valve-stem has therein a valve 9 such as is used in ordinary practice.

Extending within the bore 2 of the flexible tube, substantially from one end thereof to the other, is a flexible push member 11 having on each end thereof a head 12. The push member is of such length that the heads thereon have contact respectively with the valves 5 and 9 when the tube is attached to the valve-stem 7 so that when the valve 5 is moved to open position by application of the nozzle tip 13 of an air pressure tester, movement thereupon is imparted to the push member 11 causing concurrent opening of the valve 9 in the valve-stem.

In practice, the extension tube 1 is first inserted through the valve-stem opening 10 in the wheel-rim 14 and then screwed onto the tip of the valve-stem 7 on the inner tube 8, after the inner tube has been positioned within the tire casing 15. The casing together with the inner tube contained therein is then fitted to the wheel-rim. While the parts are thus arranged the knob 3 is disposed exteriorly with respect to the wheel-rim while the valve-stem, to which the tube 1 is attached, is contained within the tire structure in proximity to the valve-stem opening 10. The valve-stem 7 is then drawn so as to project through the valve-stem opening by pulling outwardly upon the extension tube and by holding the tube in tension. While thus held the tire is inflated, or partially inflated, by applying air under pressure from the usual air hose, which, in this instance, is introduced through the extension tube, connection being made between the nipple 4 and said air hose. The tire may be completely inflated in this manner, or, if desired, the tire may be partially inflated sufficiently to retain the inner tube and its valve stem in place, after which the extension tube may be removed and the tire completely inflated by applying the air hose to the valve-stem 7 directly, as in the usual practice.

The knob 3 serves as a stop that prevents the extension tube from being drawn through the valve stem opening into the tire structure and becoming lost therein.

By use of this invention is avoided the frequent difficulty in locating the valve-stem after assembling the inner tube and casing on the wheel-rim and positioning the valve-stem properly so as to project through the valve-stem opening in readiness for inflation of the tire.

The invention as herein disclosed is exemplary and is susceptible to variations in its structure, if desired, that may be resorted to by the exercise of skill in the art.

What I claim is:

1. An appliance for facilitating inflation of automobile tires consisting of a flexible extension tube having at one end thereof a nipple attachable to the valve-stem on the inner tube of a tire, the other end thereof having an enlargement constituting a knob and also a second nipple containing a valve, and a flexible push-member extending within the bore of said tube operably associated with the valve in said second nipple and with the valve in the valve-stem of said inner tube when said extension tube is connected with said valve-stem whereby both valves are opened when the nozzle of an air pressure tester is applied to said second nipple.

2. An appliance for facilitating inflation of automobile tires consisting of a flexible extension tube insertable through and loosely movable in the valve-stem opening in the rim of an automobile wheel, one end of said tube having a nipple attachable to the valve-stem on the inner tube of a tire placed on said rim, and its other end having an enlargement constituting a stop.

EUGENE E. GLASSLEY.